United States Patent Office 3,460,925
Patented Aug. 12, 1969

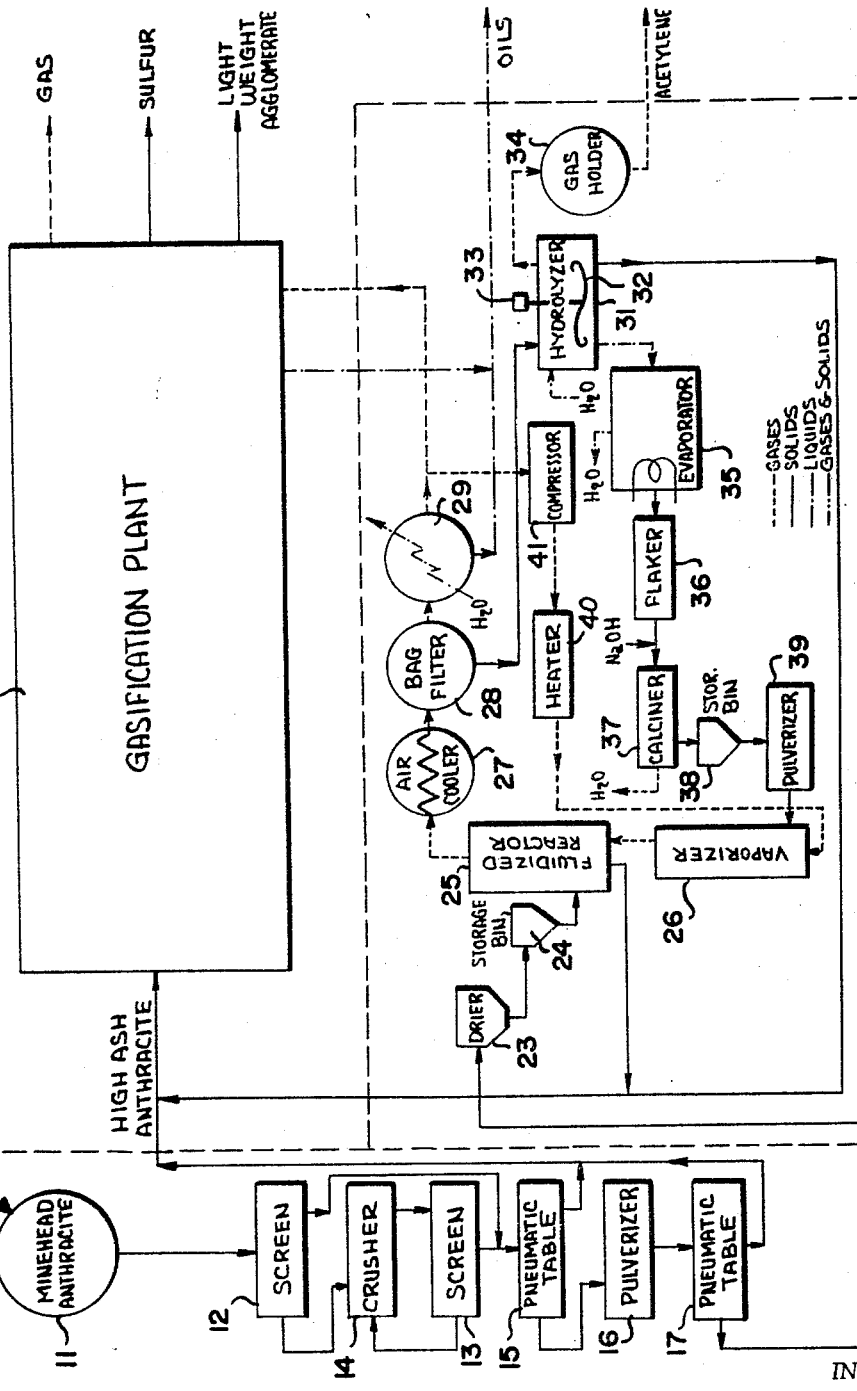

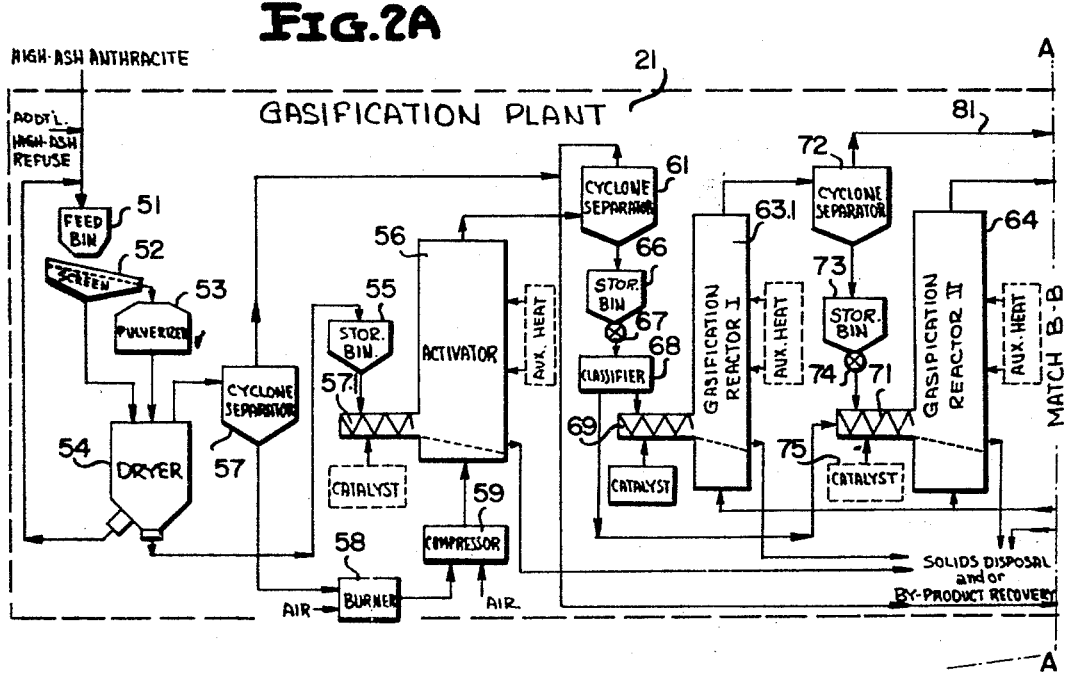
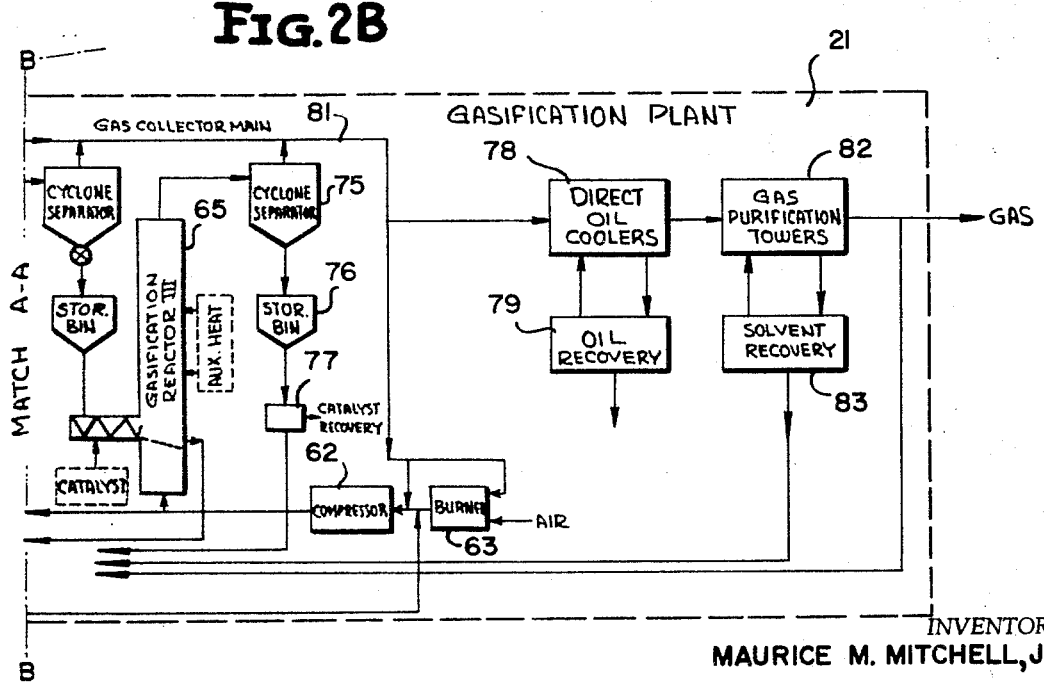

3,460,925
ANTHRACITE TO ACETYLENE CONVERSION PROCESS
Maurice M. Mitchell, Jr., Wallingford, Pa., assignor to Melpar, Inc., Falls Church, Va., a corporation of Delaware
Filed Feb. 18, 1965, Ser. No. 433,729
Int. Cl. C10h 19/00
U.S. Cl. 48—216  16 Claims

ABSTRACT OF THE DISCLOSURE

A process for gasification of solid carbonaceous fuels of low volatility, in which the solid fuel is pulverized to a 40 x 65 mesh, and the pulverized fuel then subjected to a fluidized bed reaction with and under the action of gaseous sodium oxide. Gaseous sodium carbide emanating from the fluidized bed is collected overhead and converted to solid sodium carbide which is then hydrolized to form gaseous acetylene.

---

The present invention relates generally to processes for the formation of acetylene and more particularly to a process wherein an alkali metal oxide and a low-volatile carbonaceous material such as anthracite are combined in a fluidized bed reactor to derive a gaseous metal carbide that is readily converted to acetylene.

One of the prior art methods for producing acetylene has been the high temperature (300° C.) conversion of coke and limestone to calcium carbide, which upon hydrolysis yields acetylene. This is a relatively expensive, batch, i.e. not continuous, process. According to the present invention, a carbide which yields acetylene upon hydrolysis is produced continuously, directly from anthracite or other low volatile carbonaceous material. The carbide is formed from an inexpensive and relatively volatile, alkali metal oxide.

Because such materials, and anthracite in particular, have relatively low reactivities and are known to decrepitate upon heating, the present invention derives the metal carbide, as a gas, by reacting the low volatile carbonaceous material and an oxide in a fluidized bed. The fluidized bed is selected to be approximately 40 x 65 mesh, a size that fluidizes well and allows for removal of volatile material without excessive "fines" formation. The fluidized bed technique lends itself well to a continuous, inexpensive process.

Sodium oxide is preferably employed for conversion of anthracite to the metal carbide, sodium carbide. Sodium oxide is selected because it is the least expensive volatile oxide (sublimation temperature of 1275° C.) whose carbide forms acetylene. In addition, sodium carbide has a vapor pressure of one atmosphere at 700° C. so that it can be collected as a gaseous overhead product from the reactor, thereby obviating the expensive solid separation problem that would be encountered with formation of a non-volatile carbide in a fluidized bed. Heat for the reaction process occurring in the fluidized bed is obtained by burning by-product carbon monoxide from the process. In addition, gas, as needed, is obtained from an integrated coal plant of which the acetylene plant is a part.

The integrated plant also includes a segment for deriving gasification products, such as producer or water gas, from the anthracite. The gasifying facility, of a generally conventional nature, cooperates with the acetylene producing plant in that high-ash coal deriving from the latter is supplied as one of the inputs to the former. Also, carbon monoxide and hydrocarbon by-products deriving from the two separate facilities are combined.

It is, accordingly, an object of the present invention to provide a new and improved system for producing acetylene gas from anthracite or other low-volatile carbonaceous material.

Another object of the present invention is to provide a process for forming a metal carbide suitable for conversion by hydrolysis to acetylene, which carbide is formed in response to reacting the metal oxide with anthracite.

Another object of the present invention is to provide a new and improved process for making acetylene, which process is continuously operated, and is relatively inexpensive in that it employs readily available materials of which there is an appreciable unutilized surplus.

A further object of the present invention is to provide a process integrated with an anthracite minehead, so that both acetylene and producer or water gas are derived, with cooperation between the by-products deriving from one process influencing the derivation of products in the other process.

Still another object of the present invention is to provide a process for producing acetylene by reacting, in a fluidized bed, anthracite with sodium oxide to derive sodium carbide that is easily hydrolyzed to produce acetylene.

Yet another object of the present invention is to provide a process for producing acetylene by reacting, in a fluidized bed reactor, anthracite and sodium oxide so that the sodium carbide product of that reaction may be withdrawn from an overhead outlet of the reactor in a gaseous phase.

The above and still further objects, features and advantages of the present invention will become apparent upon consideration of the following detailed description of one specific embodiment thereof, especially when taken in conjunction with the accompanying drawings, wherein:

FIGURE 1 of the drawing is a flow diagram illustrating the apparatus for carrying out the process of the present invention; and FIGURES 2A and 2B, together, are a flow diagram illustrating the specific apparatus of FIGURE 1 utilized for making producer gas.

Reference is now made specifically to FIGURE 1 wherein anthracite deriving from minehead 11 is supplied to screening, crushing and size selecting equipment comprising screens 12 and 13 between which crusher 14 is inserted. Coarse anthracite deriving from screen 12 is applied to crusher 14 along with the coarse output of screen 13, with the fine outlet of each screening operation being applied to pneumatic table or separator 15. Table 15 separates the high ash content anthracite, i.e. in excess of 7% ash, from the low ash anthracite that is supplied to pulverizer 16. The output of pulverizer 16 goes to a further pneumatic table 17, from which is derived 40 x 65 mesh anthracite, i.e. anthracite that is passed by a 40 mesh filter and retained by a 65 mesh filter. The remaining output from pneumatic table 17 is supplied along with the high ash output of pneumatic table 15 to the input of gasifier 21.

The low-ash, 40 x 65 anthracite deriving from pneumatic table 17 is supplied to acetylene plant 22. Any low-ash anthracite having the 40 x 65 characteristic that is not required for operation of the acetylene plant is derived as a by-product from the total integrated system.

Initially, anthracite supplied to acetylene producing plant 22 is dried by heating in dryer 23. The dried product deriving from dryer 23 is supplied to storage bin 24 that continuously feeds anthracite at a constant predetermined rate to fluidized bed reactor 25.

The other input to fluidized reactor 25 is vaporized sodium oxide, $Na_2O$, supplied to the reactor by vaporizer 26 at approximately 1000° C. in a carrier gas. The manner by which sodium oxide is derived is seen infra, as the description proceeds. In reactor 25, that is operated at approximately 1000° C., the vaporized carrier gas-sodium oxide mixture is used as the fluidization medium. The reaction occurring in fluidized reactor 25 is given by:

3C (anthracite) + $Na_2O \rightarrow Na_2C_2$ + CO + hydrocarbon by-products

The unreacted anthracite products of higher ash content than the original anthracite, are precipitated to the bottom of reactor 25, from whence they are supplied as part of the input to gasifier facility 21.

The sodium carbide, $Na_2C_2$, carbon monoxide, and hydrocarbon by-product gaseous mixture deriving from an outlet port at the top of reactor 25 are supplied to cooler 27 that lowers the mixture temperature to less than 700° C., the vaporization point of sodium carbide at one atmosphere of pressure. Dispersed sodium carbide and gaseous carbon monoxide are thereby derived from cooler 27 at near atmospheric pressure and supplied to bag filter 28. Filter 28 separates the products deriving from cooler 27 so that it evolves solid sodium carbide and a gaseous mixture of carbon monoxide and by-products, the mixture being supplied to water-fed cooler 29. Cooler 29 is fed with sufficient water to precipitate additional hydrocarbon fuel by-products from the carbon monoxide input thereof. Simultaneously, gaseous carbon monoxide is obtained from cooler 29 at near ambient temperature.

The solid sodium carbide precipitated from filter 28 is converted into acetylene gas in hydrolyzer 31, the other input of which is water. Stirring blade 32 of hydrolyzer 31 is constantly rotated by stirring motor 33, whereby gaseous acetylene is evolved from the top of the hydrolyzer unit. The gaseous acetylene is applied to a gas holder or tank 34 for storage purposes.

In hydrolyzing sodium carbide, the products include precipitated fines of anthracite which escaped the fluidized reactor. This anthracite contains too much water to be utilized as a reactant in fluidized reactor 25, but can be used as an input to gasifier facility 21.

A further product of hydrolyzer 31 is a sodium hydroxide-water solution that is supplied to evaporator 35. Evaporator 35 is operated at approximately 200° C. so that steam and dried, solid sodium hydroxide are derived from it. The sodium hydroxide output of evaporator 35 is supplied to flaker 36 that pulverizes it into powdered form. The sodium hydroxide output of flaker 36 is combined with sufficient powdered, makeup sodium oxide or hydroxide to keep the process in operation with the combined sodium hydroxide products being supplied to calciner 37. Calciner 37 heats the solid sodium hydroxide to a temperature whereby solid sodium oxide and water vapor gas are evolved. Solid sodium oxide is precipitated from calciner 37 and supplied to storage bin 38 which feeds vaporizer 26 via pulverizer 39. Pulverizer 39 continuously supplies vaporizer 26 with sodium oxide fine enough to pass through a 60 mesh filter so that it is readily vaporized in response to heat applied to vaporizer 26 by burning gas from gasifier facility 21 and by gaseous carbon monoxide from cooler 29.

Carbon monoxide evolved from cooler 29 is supplied through compressor 41 where it is heated. Gases deriving from compressor 41 are heated additionally, to about 1000° C., in heater 40 by gases from gasification plant 21. The hot gases evolving from heater 40 are of sufficient temperature to vaporize the $Na_2O$ supplied by pulverizer 39 to vaporizer 26. These gases are supplied to vaporizer 26 to serve as the carrier gas for sodium oxide supplied by the vaporizer to fluidized reactor 25. If sufficient sodium hydroxide is applied to calciner 37 from an external source, acetylene facility 22 is capable of converting approximately two-thirds, by weight, of its input anthracite to acetylene.

If sufficient sodium carbide is not reacted with single reactor 25, additional reactors may be series connected with the single reactor specifically illustrated. While $Na_2O$ is the preferred gaseous input to reactor 25 because it forms the least expensive volatile carbide that produces acetylene, it is to be understood that any alkali metal oxide can, in theory, be utilized as an input for reactor 25.

Reference is now made to FIGURE 2 of the drawings wherein a detailed embodiment of the process for converting high-ash content anthracite into producer or water gas is specifically illustrated. The high-ash content outputs of pneumatic tables or separators 15 and 17 are applied to feed bin 51, along with precipitated by-products of fluidized reactor 25 and wet anthracite deriving from hydrolyzer 31. The anthracite deposited in bin 51 is supplied to screen 52, that separates the very fine anthracite or dust from coarser anthracite that is subsequently ground to dust in pulverizer 53. The finely divided outputs of screen 52 and pulverizer 53 are supplied to dryer 54, operated at approximately 200° C. At the bottom of dryer 54 is provided a filter for recycling back to feed bin 51 anthracite that is not passed by a ¼″ filter, so that the screening and pulverizing operation is repeated, as necessary. The main coal stream deriving from the bottom of dryer 54 is supplied to storage bin 55 that feeds activator reactor 56 with a continuous flow of anthracite. A transitional metal oxide catalyst, such as finely divided iron oxide, $Fe_2O_3$, is also supplied to activator 56 via substantially the same path as between the activator and storage bin 55, through screw feed 57.1.

The other output of dryer 54, anthracite that has been fluidized, is applied to cyclone or pneumatic separator 57. Separator 57 supplies the high ash content fines, that pass through a 65 mesh filter, to burner 58. The other products from separator 57, gases derived from the coal, are supplied farther down stream in the system to compressor 62.

The fine ash deriving from cyclone separator 57 is heated to a relatively high temperature in burner 58 in response to combustion with air supplied to the burner. The hot products deriving from the burner 58 are supplied to compressor 59 and as heat to the various reactors and calciners in the integrated facility. Heat supplied to compressor 59 produces a forced air stream that is coupled to the bottom of activator 56, causing the catalytic and fuel products supplied to the activator by screw feed 57.1 to be fluidized. The reaction occurring in activator 56 between its anthracite and gas inputs by which CO, $N_2$, and hydrocarbon gases are evolved takes place at approximately 1000° C. It is controlled so that the anthracite is preoxized and made porous. Care must be taken to avoid complete anthracite combustion and reaction in activator 56. The precipitated, unreacted products in activator 56 that are too heavy to be fluidized are collected at the bottom of the chamber, filtered and disposed of for catalytic recovery. The gaseous products deriving from activator 56 are supplied to cyclone separator 61 that precipitates the oxidized anthracite from the gaseous products.

The gaseous products deriving from separator 61 are combined with those evolving from separator 57 and are applied to compressor 62. Other heated gases are supplied to compressor 62 by burner 63, whereby the compressor output includes high pressure carbon dioxide and air or oxygen.

The high pressure gases deriving from compressor 62 are supplied to the bottoms of series reactors 63.1, 64 and 65 as fluidizing reactants. The fuel inputs to reactors 63.1 and 64 are derived from anthracite precipitated from cyclone separator 61 that is supplied through storage bin 66 to throttle valve 67 to classifier 68. Classifier 68 feeds ¼ x 40 mesh anthracite, that is, anthracite collected bebetween a ¼″ and 40 mesh filter, to reactor 63.1 via screw feed 69. Anthracite dust that is passed through the 40 mesh filter of classifier 68 is fed as an input to screw feed 71, supplying reactor 64.

¼ x 40 anthracite deriving from classifier 61 is combined with a catalytic agent, preferably $Fe_2O_3$, and both agents are fed to reactor 63.1 via screw feed 69. These agents are then updrafted and the anthracite is reacted with the carbon dioxide and air products supplied to the bottom of the reactor so that gaseous carbon monoxide, nitrogen and fluidized coal, along with small amounts of oxygen and hydrocarbons are evolved from the top of the reactor. Coal ash and the catalysts are precipitated from the bottom of reactor 63 and supplied to a solid disposal facility for removing the catalysts so that they can be reused.

The products evolving from reactor 63.1 are supplied to further cyclone separator 72 that precipitates the finely divided coal from the remaining gaseous products. The coal is supplied to screw feed 71 through additional storage bin 73 and throttle valve 74. Because any coal that comes off the top of reactor 63.1 must be very finely divided, there is no need for an additional classifying stage and this finely divided coal is readily intermixed, with anthracite passing through 40 mesh filter classifier 68. An $Fe_2O_3$ catalyst 75, required to make the reaction occur, is supplied to reactor 64 via screw feed 71. The products fed to screw feed 71 are deposited into reactor 64, from which substantially the same products as produced in reactor 63.1 are derived.

Reactor 64 is of larger volume than reactor 63.1 although it does not necessarily handle a larger weight of active fuel materials. This is because the fuel supplied to reactor 64 is considerably finer, more readily dispersed and made fluent than the anthracite supplied to reactor 63.1. The reactants evolving from reactor 64 are again cyclone separated, according to whether they are gaseous or coal, with the coal being supplied to a third stage through exactly the same type of apparatus as is involved in supplying coal to reactor 64.

Anthracite input to reactor 65 includes only the output of reactor 64, with nothing being supplied by classifier 68 or reactor 63.1. Because the amount of anthracite fuel supplied to reactor 65 is considerably less than that fed to either of reactors 63.1 or 64, the volume of the former reactor is considerably smaller than of the latter. The output of reactor 65 is fed to a cyclone separator wherein gaseous carbon monoxide and nitrogen are divided from carbon and the other solid products that are evolved from reactor 65.

Solid products precipitated from cyclone separator 75 are fed through storage bin 76 to catalytic recovery stage 77 that divides coal ash from the $Fe_2O_3$ catalysts. The unrecovered output of recovery stage 77 is supplied to solid disposal facility, also fed by each of the other reactors as well as from other apparatus that evolve waste material in the process. The gaseous carbon monoxide, nitrogen and hydrocarbon products evolving from the cyclone separators associated with each of reactors 63.1, 64 and 65 are supplied in parallel to oil recovery facility 78, burner 63 and compressor 62.

Air or oxygen supplied to burner 63, along with the output products of the various cyclone separators, is heated and then forced under pressure into reactors 63.1, 64, 65 by means of compressor 62. In certain instances, air is supplied to burner 63 as the main combustion gas in the reactors because of its low cost. Oxygen, however, has the advantage of providing much more complete reactions in each of reactors 63.1, 64, 65 because the large percentage of inert nitrogen, present in air, is not fed to the reactors. Likewise steam can be added to the input for compressor 62 to enrich the gaseous products with hydrogen.

The temperature of hydrocarbon gases evolving from the various cyclone separators is reduced in oil cooler 78 that supplies oil recovery stage 79. A feedback arrangement between oil cooler 78 and oil recovery stage 79 is provided, whereby the cooled recovered oil serves as a coolant for the hot gases evolving from gas collector main 81. Oil recovered in stage 79 is combined with oil evolving from water-fed cooler 29, in acetylene producing facility 22, to produce a hydrocarbon by-product from the complete system.

Carbon monoxide, nitrogen and water vapor that are not cooled sufficiently in cooler 78 to form liquids are supplied to gas purification tower facility 82. In gas purification tower facility 82, sulphur compounds are constantly removed from the products normally associated with producer and water gas. The usual sulphur solvents are supplied to and recovered from purification facility 82 by recovery stage 83. Producer gas evolving from purification tower facility 82 is supplied to a coal pumping station to force the pulverized coal not needed to run acetylene producing facility 22 through a pipeline. Thereby, a single pipeline is capable of carrying two fuels, producer gas and anthracite, with one of the fuels being utilized as a pumping agent.

While anthracite has been specifically described as the input to the system, it is to be understood that other carbonaceous materials having low volatility, such as coke, graphite or charcoal, can be employed. By low carbonaceous materials, it is understood that reference is made to those substances that are between 1% and 10%, by weight, volatile. Materials over 10% volatile, such as bituminous coal, should not be employed because they form a fluid that cannot be tolerated in a fluidized bed reactor which is designed to handle only dry non-agglomerating particles. The lower limit is selected on a practical economic basis because of high material cost and low yield.

I claim:

1. A method for forming sodium carbide suitable for use in producing acetylene comprising reacting anthracite with gaseous sodium oxide in a fluidized bed reactor to derive gaseous sodium carbide and carbon monoxide.

2. The method of claim 1 wherein anthracite supplied to said fluidized bed reactor is passed by a 40 x 65 mesh.

3. A method for forming an alkali metal carbide suitable for use in producing acetylene comprising reacting anthracite with a gaseous oxide of said alkali metal in a fluidized bed reactor to derive in gaseous form said alkali metal carbide and carbon monoxide.

4. A method for producing acetylene comprising the steps of reacting anthracite with gaseous sodium oxide in a fluidized bed reactor to derive gaseous sodium carbide and carbon monoxide, precipitating sodium carbide as a solid from said gaseous products deriving from said fluidized bed reactor, and hydrolyzing said precipitated sodium carbide.

5. The process according to claim 4 wherein sodium hydroxide is produced during said hydrolyzing step, drying said sodium hydroxide, heating said sodium hydroxide to derive sodium oxide, vaporizing the derived sodium oxide, and supplying said vaporized sodium oxide as an input to said fluidized bed reactor.

6. An integrated process for producing acetylene and producer gas in response to input anthracite comprising the steps of supplying at constant flow rate low-ash anthracite to a fluidized bed reactor, reacting said low-ash anthracite with sodium oxide in vapor form in said fluidized bed reactor to derive gaseous sodium carbide and carbon monoxide, deriving solid sodium carbide from said gaseous sodium carbide, hydrolyzing said solid sodium carbide to derive acetylene, precipitating unreacted high-ash anthracite from said fluidized bed reactor, supplying said high-ash anthracite deriving from said fluidized bed reactor along with high-ash input anthracite to a gasifying facility for evolving carbon monoxide fuel gas, said carbon monoxide fuel gas producing step including gasifying air or oxygen with the anthracite input thereto.

7. A method for forming sodium carbide suitable for use in producing acetylene comprising continuously reacting anthracite with gaseous sodium oxide in a fluidized bed reactor to derive gaseous sodium carbide and carbon monoxide.

8. A method for forming sodium carbide suitable for use in producing acetylene comprising continuously supplying gaseous sodium oxide to a fluidized bed reactor, continuously supplying anthracite to said fluidized bed reactor, and operating said reactor at a temperature sufficiently high to evolve gaseous sodium carbide and carbon monoxide.

9. A method for forming the carbide of an alkali metal suitable for use in producing acetylene comprising continuously supplying the oxide of said alkali metal in vapor phase to a fluidized bed reactor, continuously supplying anthracite to said fluidized bed reactor, and operating said fluidized bed reactor at a temperature sufficiently high to derive the carbide of said alkali metal in gaseous form and carbon monoxide.

10. A method for forming the carbide of an alkali metal suitable for use in producing acetylene comprising continuously supplying the oxide of said alkali metal in vapor phase to a fluidized bed reactor, continuously supplying a carbonaceous material of low volatility to said fluidized bed reactor, and operating said fluidized bed reactor at a temperature sufficiently high to derive the carbide of said alkali metal in gaseous form and carbon monoxide.

11. A method for forming an alkali metal carbide suitable for use in producing acetylene comprising reacting a carbonaceous material of low volatility with a gaseous oxide of said alkali metal in a fluidized bed reactor to derive in gaseous form said alkali metal carbide and carbon monoxide.

12. A method for forming sodium carbide suitable for use in producing acetylene comprising continuously reacting a carbonaceous material of low volatility with gaseous sodium oxide in a fluidized bed reactor to derive gaseous sodium carbide and carbon monoxide.

13. Process for gasification of solid carbonaceous fuel of low volatility, said solid fuel ranging in volatility from 1% to 10% by weight, comprising pulverizing said solid fuel to 40 x 65 mesh, feeding gaseous sodium oxide through the 40 x 65 mesh fuel to produce intimate contact therebetween in a fluidized bed reaction, collecting gaseous sodium carbide deriving from said fluidized bed reaction, converting the collected gaseous sodium carbide to solid sodium carbide, and hydrolyzing the solid sodium carbide to generate gaseous acetylene.

14. Process according to claim 13 wherein said fuel is anthracite.

15. Process according to claim 13 wherein said collected gaseous sodium carbide is converted to solid sodium carbide by reducing the temperature thereof to a point below the vaporization temperature, and separating the solid sodium carbide so evolved from gaseous by-products of said fluidized bed reaction.

16. Process according to claim 13 wherein the hydrolysis of said solid sodium carbide obtained from said conversion of gaseous sodium carbide is performed by intimately contacting said solid sodium carbide with liquid water under agitation.

References Cited

UNITED STATES PATENTS

| 556,736 | 3/1896 | Clarke | 48—216 |
|---|---|---|---|
| 935,880 | 10/1909 | Zell | 48—216 |
| 3,066,083 | 11/1962 | Reid | 48—216 XR |

FOREIGN PATENTS 841,569    7/1960    Great Britain.

MORRIS O. WOLK, Primary Examiner

R. E. SERWIN, Assistant Examiner

U.S. Cl. X.R.

23—208